Figure 1:
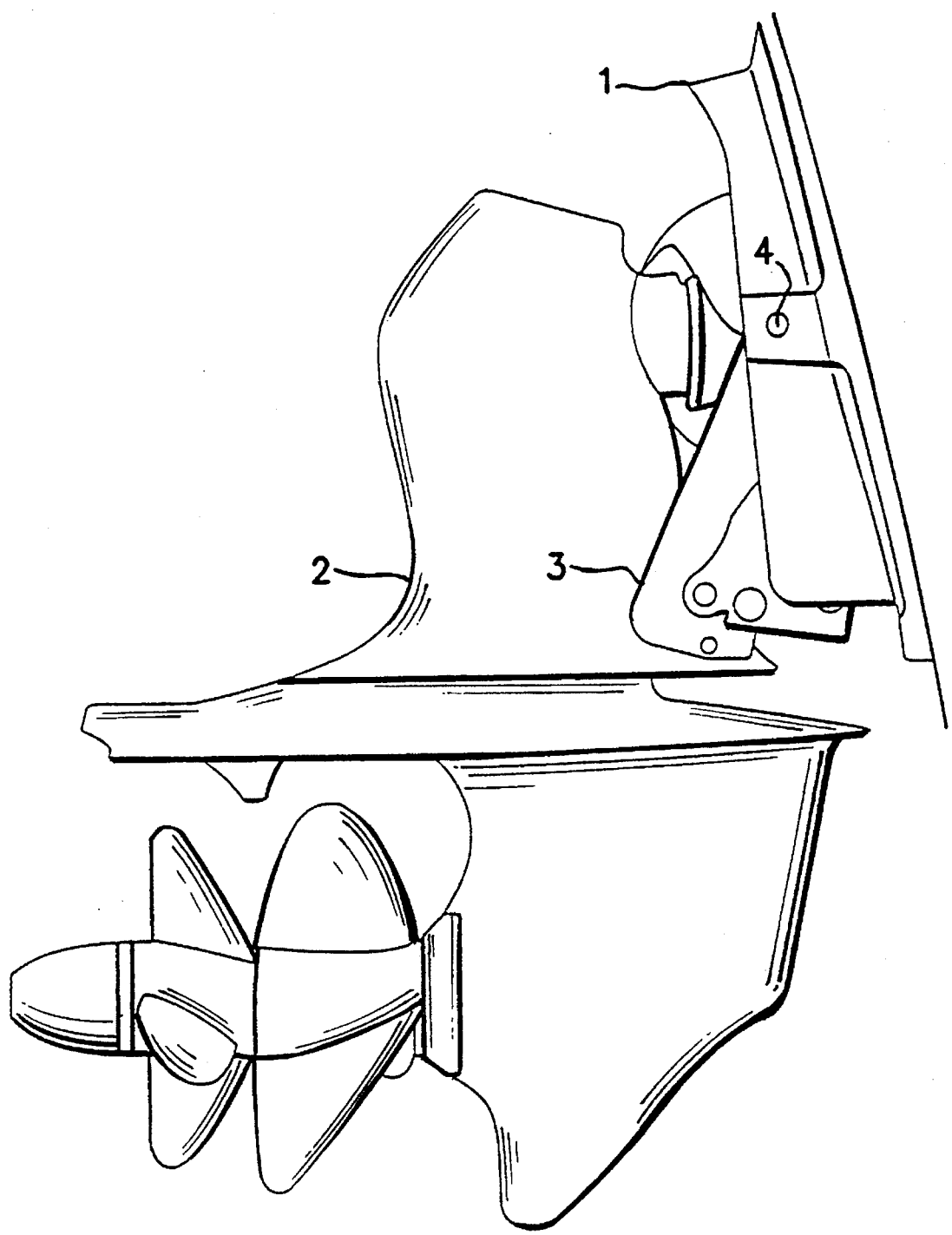

United States Patent [19]

Arvidsson et al.

[11] Patent Number: 5,584,225
[45] Date of Patent: Dec. 17, 1996

[54] HYDRAULIC CYLINDER, ESPECIALLY A TRIM AND TIP CYLINDER FOR OUTBOARD TYPE BOAT PROPELLER DRIVE UNITS

[75] Inventors: Lennart Arvidsson, Kållered; Anders Bergquist, Hjälteby; Stig Larsson, Torslanda; Lennart Uhlander, Hindås, all of Sweden

[73] Assignee: AB Volvo Penta, Gothenburg, Sweden

[21] Appl. No.: 428,233

[22] PCT Filed: Oct. 29, 1993

[86] PCT No.: PCT/SE93/00903

§ 371 Date: May 1, 1995

§ 102(e) Date: May 1, 1995

[87] PCT Pub. No.: WO94/10459

PCT Pub. Date: May 11, 1994

[30] Foreign Application Priority Data

Oct. 29, 1992 [SE] Sweden ................... 9203191

[51] Int. Cl.⁶ ................... F15B 15/22; F15B 11/08; B63H 5/125
[52] U.S. Cl. ................... 91/405; 91/422; 440/61
[58] Field of Search ................... 91/19, 23, 399, 91/401, 440, 415, 416, 422, 405, 406; 440/56, 61, 65

[56] References Cited

U.S. PATENT DOCUMENTS

| | | | |
|---|---|---|---|
| 2,807,081 | 9/1957 | Black | 91/399 X |
| 3,413,894 | 12/1968 | Kress et al. | 91/405 X |
| 3,808,946 | 5/1974 | Bell et al. | 91/422 X |
| 4,050,359 | 9/1977 | Mayer | 91/422 X |
| 4,308,018 | 12/1981 | Nakamura et al. | 440/61 |
| 4,363,629 | 12/1982 | Hall et al. | 91/422 X |
| 4,784,625 | 11/1988 | Nakamura | 440/56 X |
| 4,825,752 | 5/1989 | Kiffmeyer | 91/422 |
| 5,195,914 | 3/1993 | Binversie et al. | 440/56 |
| 5,358,436 | 10/1994 | Soda et al. | 440/61 |

FOREIGN PATENT DOCUMENTS

| | | | |
|---|---|---|---|
| 1176498 | 9/1972 | Germany . | |
| 2143181 | 10/1977 | Germany . | |
| 3230111 | 2/1984 | Germany | 440/61 |
| 62-137296 | 6/1987 | Japan | 440/61 |
| 2-189299 | 7/1990 | Japan | 440/61 |

Primary Examiner—John E. Ryznic
Attorney, Agent, or Firm—Young & Thompson

[57] ABSTRACT

A hydraulic cylinder provided in its piston with axial channels with check valves permitting fluid flow in one direction from one cylinder chamber to the other. Constricting means in the form of a spring-biased plate displaceably mounted on the piston rod covers, after a certain displacement of the piston, a portion of the outlet openings of the axial channels to reduce the flow-through cross-sectional area and brake the piston movement.

8 Claims, 3 Drawing Sheets

HYDRAULIC CYLINDER, ESPECIALLY A TRIM AND TIP CYLINDER FOR OUTBOARD TYPE BOAT PROPELLER DRIVE UNITS

The present invention relates to a hydraulic piston-cylinder device, especially intended for trimming or tipping an outboard type boat propeller drive, comprising a cylinder, a piston displaceable in the cylinder, dividing the interior of the cylinder into two cylinder chambers, and a piston rod joined to the piston and extending out through an opening in one cylinder end wall, said piston having at least one axial through-passage with stop valve means permitting fluid to flow in one direction through the piston from one cylinder chamber to the other.

In, for example, one known boat propeller drive, a pair of trim and tip cylinders of the type described above are arranged between the drive shield and and rig, each cylinder being articulated in the shield and engaging the rig with the associated piston rod. When trimming out or tipping up the rig, hydraulic fluid is supplied to the cylinder chamber on the piston side, whereupon the cylinder chamber on the piston rod side is drained to a tank. If the rig during operation strikes an object in the water, which forces the rig to be tipped up, hydraulic fluid can flow through the passage in the piston from the cylinder chamber on the piston rod side to the opposite cylinder chamber if the force on the rig is so great that the fluid pressure created on the piston rod side exceeds the pressure on the opposite side, which permits rapid extension of the piston rod and rapid tipping of the rig. In this manner, the risk of serious damage to the rig is reduced when running aground, for example. In a known design of a boat propeller drive of the type described, a rubber buffer is used between the shield and the rig as an end abutment so that rapid tipping of the rig will not cause damage to the drive.

The purpose of the present invention is to achieve a piston-cylinder device of the type described by way of introduction which is particularly, but not exclusively, intended to be used in a tippable boat propeller drive by making it possible to vary the resistance to piston movement caused by an external force, depending on the position of the piston in the cylinder.

This is achieved according to the invention by virtue of the fact that constricting means cooperating with the piston are arranged, after a certain piston movement in the direction resulting in fluid flow from one cylinder chamber to the other via the check valve means to reduce the flow-through the area of the axial passage to brake continued piston movement.

A piston-cylinder device of this type can, for example, be used as a trim and tip cylinder in a boat propeller drive so that if the rig collides with a floating object or runs aground, it will provide less resistance to piston movement during initial tipping up of the rig and, after a certain piston movement, representing a certain tipping up angle, will increase this resistance and provide controlled breaking of the swing movement, so that, inter alia, the need for a rubber buffer is eliminated.

Figure 2:
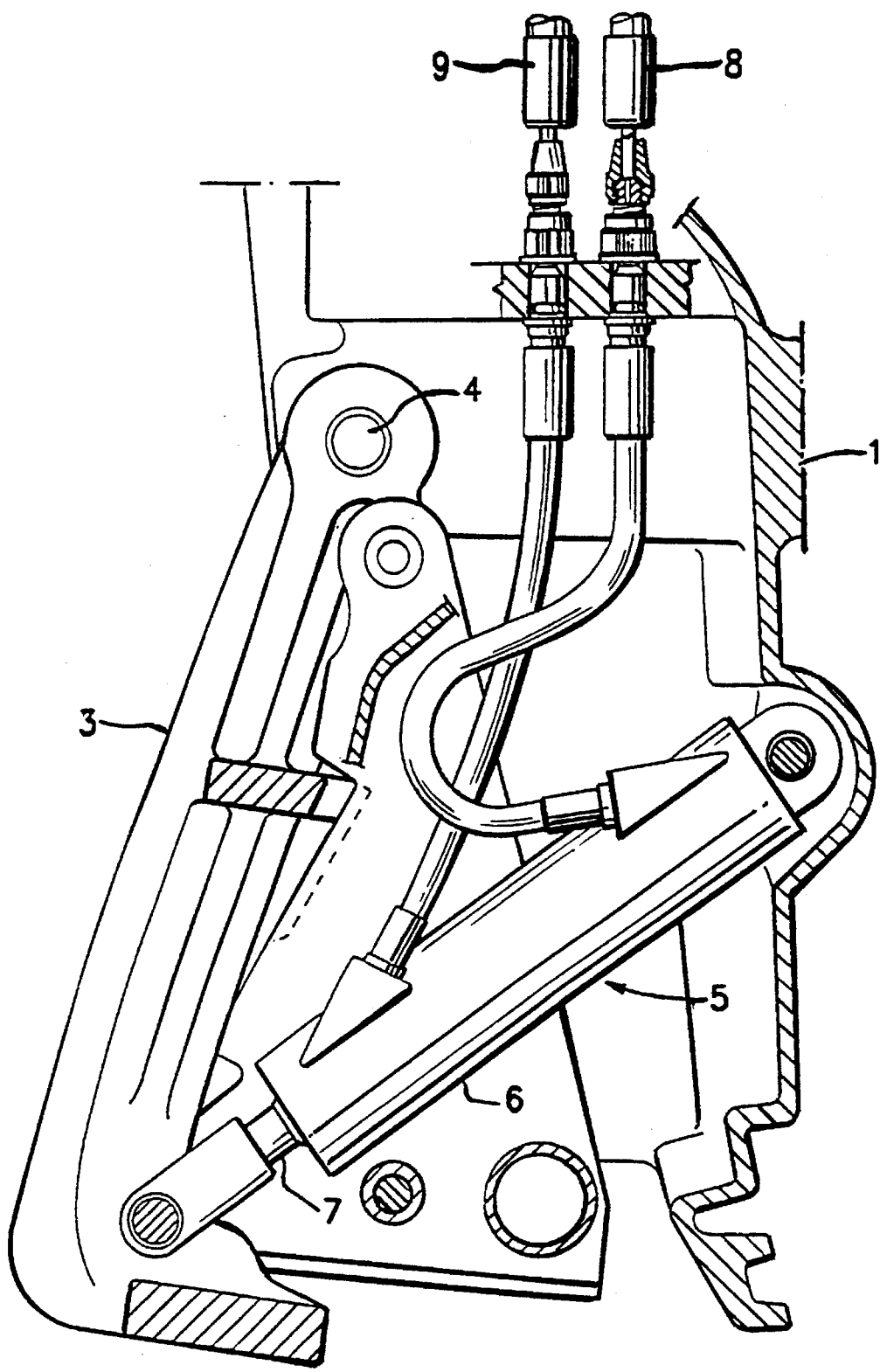
Figure 3:
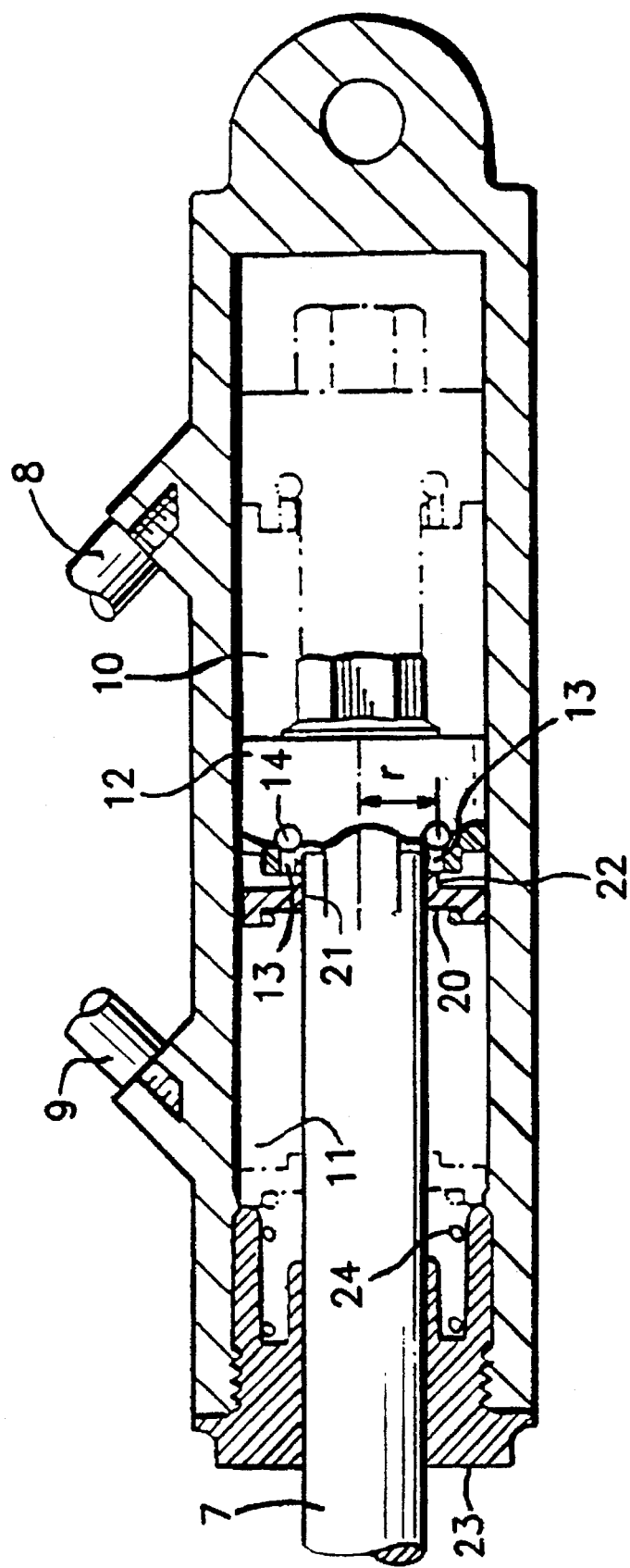

The invention will be described in more detail with reference to examples shown in the accompanying drawings, where FIG. 1 shows a schematic side view of a boat propeller drive of outboard type, FIG. 2 shows a partially sectioned side-view of certain components in the rig suspension of the drive, and FIG. 3 is a longitudinal section through one embodiment of a piston-cylinder device according to the invention.

FIG. 1 shows a propeller drive which is known per se of so-called Aquamatic® type, comprising a shield 1 designed to be solidly mounted in an opening in a boat transom. A propeller rig, generally designated 2, is suspended in a forked supporting bracket 3, which is pivotally mounted in the shield 1 for pivotal movement about a horizontal pivot axis 4. A pair of hydraulic piston-cylinder devices 5 (one shown in FIG. 2) are arranged symmetrically relative to a centre plane of the propeller drive. Each cylinder is pivotally mounted in the shield 1, while the associated piston rod 7 is mounted in the supporting element 3. The cylinder 6 is coupled into a hydraulic circuit (not shown in more detail here) via lines 8 and 9. When hydraulic fluid is supplied to the cylinder chamber 10 (see FIG. 3) via line 8, fluid is drained from the cylinder chamber 11 via line 9, and the rig 2 is trimmed out, i.e. its angle relative to the shield 1 increases.

A piston 12 joined to the piston rod 7 has, as is indicated in FIG. 3, a number of axial through-channels 13 evenly distributed about a circle, each of which containing a check valve element 14 in the form of a spring-biased ball, which under all operating conditions, blocks liquid flow in the direction from cylinder chamber 10 on the piston side to cylinder chamber 11 on the piston rod side, but permits fluid flow in the opposite direction, if the pressure in cylinder chamber 11 should exceed the pressure in cylinder chamber 10. This can, for example, occur if the rig 2 strikes an object in the water or runs aground, so that the outwardly directed force on the piston rod 7 and the piston 12 will create a sufficiently great increase in pressure in cylinder chamber 11. The fluid can then be rapidly evacuated from the cylinder chamber 11 into cylinder chamber 10 to permit a rapid tipping up of the rig, thus reducing the risk of serious damage to the rig.

In known propeller drives of the type described, the rig can in general be tipped up so that its lower end lies somewhat above the surface of the water, with the aid of the described cylinder device 5. This means that the upper end of the rig in certain cases can strike the shield and to reduce the risk of damage in such a case, a rubber buffer is usually mounted on the shield to absorb the impact.

There is, however, no need for continued rapid tipping movement of the rig when it has left the water. Instead, it is desirable to brake the movement. According to the invention, a constricting element in the form of a circular plate 20 is arranged in the cylinder 6 to provide this braking function. The plate 20 has a central bore 21 for displaceable mounting on the same on the piston rod 7. The outer diameter of the plate 20 is adapted to the inner diameter of the cylinder, so that the plate can easily slide in the cylinder. The plate is provided on its side facing the piston 12 with a shoulder 22, the radius of which is approximately equal to the radius "r" of the circle on which the centres of the axial channels 13 lie. This means that the shoulder 22 will cover approximately half of the outlet of the channels 13 and thus reduce the flow-through area by approximately one half, when the plate lies in the position shown with solid lines in FIG. 3. A helical spring 24 placed between the end wall 23 of the cylinder 6 and the plate 20 keeps the plate 20 in its unloaded state in this position.

Normally, during operation, the piston 12 is at or near the position shown with dash-dot lines in FIG. 3. If the piston rod 7, for one of the above-mentioned reasons, is subjected to a sudden outwardly directed force, the piston 12 will first move rapidly from the position shown with dash-dot lines to the position shown with solid lines, thanks to the relatively great total flow-through area of the axial channels 13. When the plate 20 comes into contact with the piston 12, the flow-through area is reduced to approximately half of the original, which results in a constriction of the flow through the piston and a braking of the piston movement during the remaining portion of the path of movement of the piston.

Even though the piston-cylinder device according to the invention has been described with reference to a preferred application, it is of course also possible to use it in other contexts, where one can utilize the described functional principle of variable resistance.

We claim:

1. In a hydraulic piston-cylinder device, comprising a cylinder, a piston which is displaceable in the cylinder and which divides the interior of the cylinder into two cylinder chambers, and a piston rod joined to the piston and extending out through an opening in one cylinder end wall, said piston having at least one axial through-passage with check valve means permitting fluid flow in only one direction through the piston from one cylinder chamber to the other and preventing fluid flow from said other cylinder chamber to said one cylinder chamber; the improvement comprising means (8, 9) for connecting the cylinder in a hydraulic circuit to drain fluid from said one cylinder chamber (10) and to supply fluid to said other cylinder chamber (10), and constricting means (20) cooperating with the piston (12) and arranged, after a certain piston movement in the direction resulting in fluid flow from said one cylinder chamber (11) to said other (10) via the check valve means (14), to reduce the flow-through area of the axial passage (13) to brake continued piston movement.

2. Device according to claim 1, characterized in that the check valve means (13) are arranged to permit fluid flow from the cylinder chamber (11) on the piston rod side to the opposite cylinder chamber (10) and that the constricting means comprise a valve element (20) moveably mounted in the former cylinder chamber, said element after a certain piston movement upon contact with the surface of the piston (12) facing the piston rod (7), covers a portion of the outlet opening of said passage (13).

3. Device according to claim 2, characterized in that between the valve element (20) and the inside of said cylinder end wall (23), inset spring means (24) press the valve element against the piston surface after a certain piston movement.

4. Device according to claim 2, characterized in that the valve element is a circular plate (20) displaceable on the piston rod (7) and having a circular shoulder (21) facing the piston (12), said shoulder, upon contact with the piston, covering a portion of the outlet opening.

5. Device according to claim 4, characterized in that the piston (12) has a plurality of axial passages (13) evenly distributed along a circle and provided with check valve means (14), said axial passages having circular cross-section and their centres lying on a radius approximately equal to the radius (r) of the outer edge of the shoulder (21) of the plate (20).

6. In a boat propeller drive, comprising a shield intended to be solidly joined to the transom of a boat, a propeller rig, which is suspended in the shield for pivotal movement relative thereto about a horizontal pivot axis, and at least one hydraulic piston-cylinder device operating between the shield and the rig, the cylinder of said device being pivotably joined to either the shield or the rig, the piston rod joined to the piston extending through an opening in one cylinder end wall and engaging the other one of said components, said piston dividing the interior of the cylinder into two cylinder chambers, and having at least one axial through-passage with check valve means permitting fluid flow in only one direction through the piston from the cylinder chamber on the piston rod side to the other cylinder chamber; the improvement comprising means (8, 9) for connecting the cylinder in a hydraulic circuit to drain hydraulic fluid from the cylinder chamber (11) on the piston rod side and to supply fluid to said other cylinder chamber (10), and constricting means (20) cooperating with the piston (12) and arranged, after a certain piston movement in the direction towards the piston rod side, to reduce the flow-through area of the axial passage (13) to brake continued piston movement.

7. Boat propeller drive according to claim 6, characterized in that constricting means are formed by a circular plate (20) displaceably mounted on the piston rod (7) and having a circular shoulder (21) facing the piston (12), said shoulder, upon contact with the piston, covering a portion of the outlet opening of said passage (13), and that between the plate and the inside of said cylinder end wall (23) inset spring means (24) press the plate against the piston surface after a certain piston movement.

8. Boat propeller drive according to claim 7, characterized in that the piston (12) has a plurality of passages (13) distributed evenly along a circle and provided with check valves (14), said passages having circular cross-section, the centres of which lying on a radius (r) approximately equal to the radius of the outer edge of the shoulder (21) of the plate.

* * * * *